United States Patent

[11] 3,572,655

| [72] | Inventor | John E. Brown<br>6601 S. Whipple St., Chicago, Ill. 60629 |
|---|---|---|
| [21] | Appl. No. | 854,384 |
| [22] | Filed | Sept. 2, 1969 |
| [45] | Patented | Mar. 30, 1971 |

[54] POLLUTED AIR ABATEMENT DEVICE
13 Claims, 11 Drawing Figs.

[52] U.S. Cl. .......................................... 261/21,
 55/223, 55/240, 261/118, 261/113
[51] Int. Cl. ............................................ B01f 3/04
[50] Field of Search ............................. 261/17, 21,
 22, 116, 16, (FGW), 118, 113; 55/223, 240, 242

[56] References Cited
UNITED STATES PATENTS

| 934,205 | 9/1909 | Nix | 261/116 |
|---|---|---|---|
| 1,169,764 | 2/1916 | Brassert | 55/223X |
| 1,434,301 | 10/1922 | Liljegran | 55/242X |
| 1,620,826 | 3/1927 | Mitchell | 261/22 |
| 2,017,031 | 10/1935 | Stratton | 261/116 |
| 2,802,543 | 8/1957 | Clark | 261/116X |
| 3,332,214 | 7/1967 | Huppke | 261/116 |
| 3,393,901 | 7/1968 | Krause | 261/118X |

*Primary Examiner*—Tim R. Miles
*Attorney*—Wheeler, Wheeler & House

ABSTRACT: A polluted air abatement device including a closed tank partially filled with liquid and having a flue at each end, a number of baffles dividing the portion of the tank above the liquid into separate compartments, a sprayer head in each baffle offset from the sprayer heads in adjacent baffles and having a plurality of polluted air orifices, elongated spray orifices in each sprayer head positioned to provide a converging spray in the direction of flow of polluted air through the compartments, a nozzle in each compartment to direct a stream of liquid toward the polluted air orifices of the sprayer head in that compartment, and a recirculating pump assembly to pump filtered liquid from the tank to the sprayer heads and sprayer nozzles.

Patented March 30, 1971

Inventor
John E. Brown
By
Wheeler, Wheeler, House & Clemency
Attorneys

Patented March 30, 1971 3,572,655
3 Sheets-Sheet 2
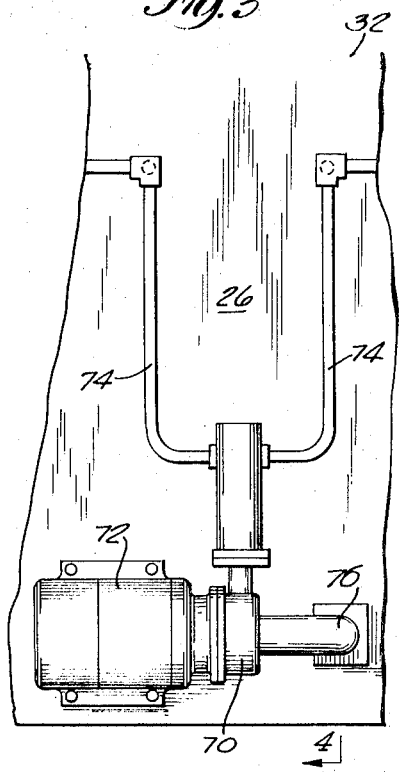
Fig. 3
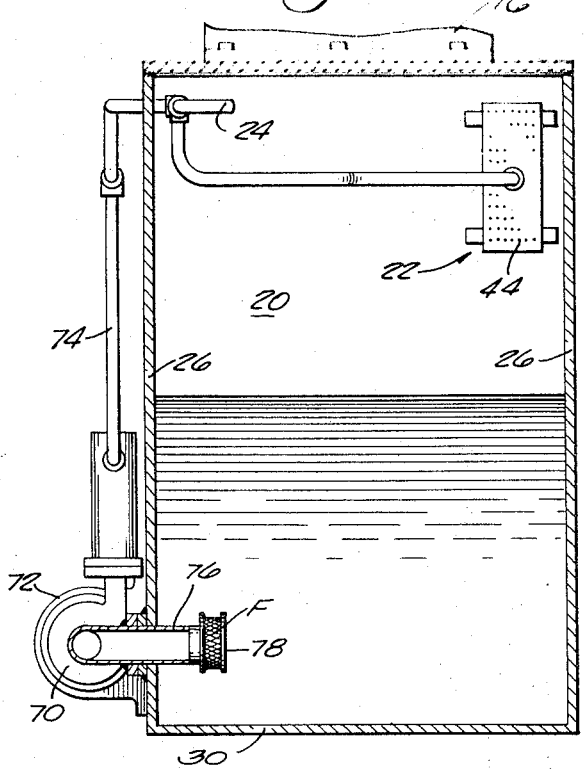
Fig. 4
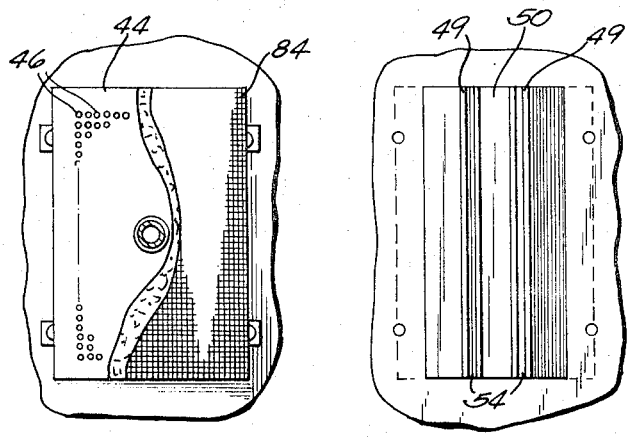
Fig. 5  Fig. 6
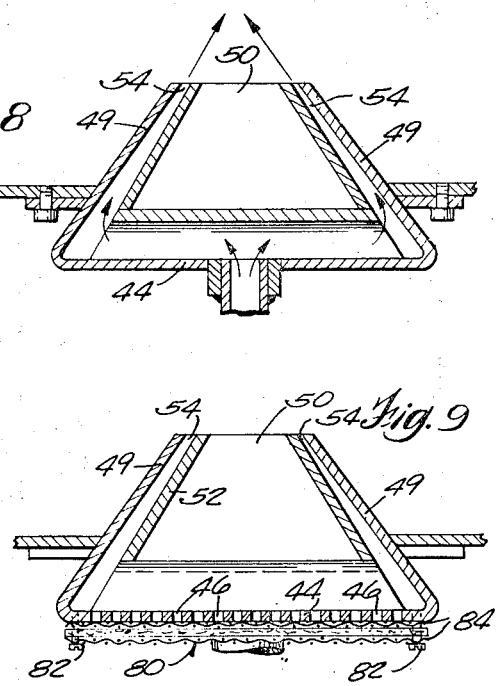
Fig. 8
Fig. 9
Inventor
John E. Brown
By
Wheeler, Wheeler, House & Clemency
Attorneys Patented March 30, 1971 3,572,655
3 Sheets-Sheet 3
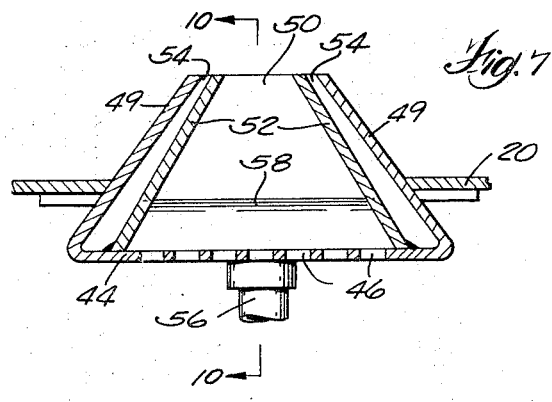
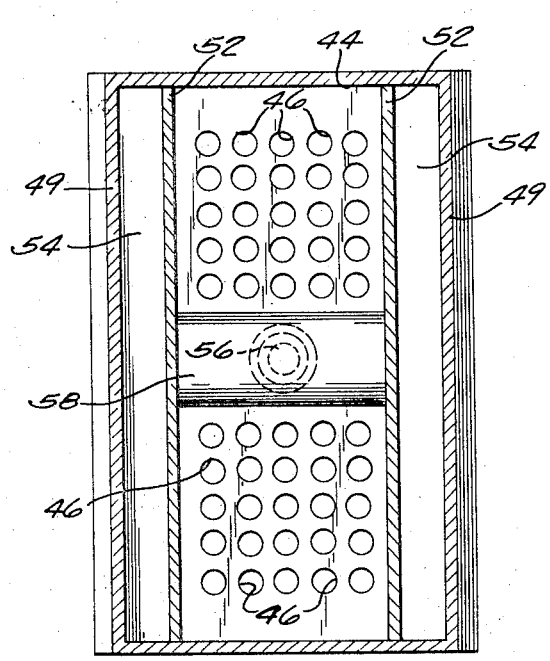
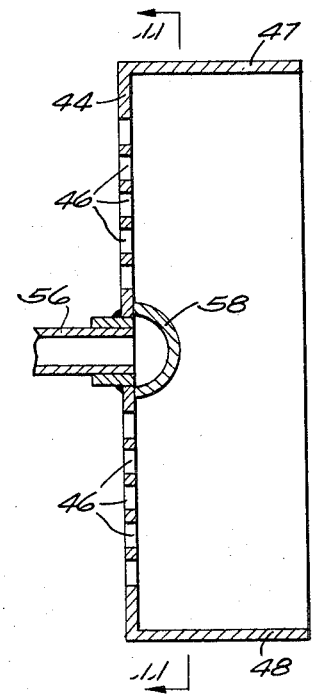
Inventor
John E. Brown
By
Wheeler, Wheeler, House & Clemency
Attorneys

POLLUTED AIR ABATEMENT DEVICE

BACKGROUND OF THE INVENTION

It is well known that solids such as dust or fly ash and gases such as sulfur dioxide, carbon dioxide and carbon monoxide are major contributors to air pollution. Various attempts have been made to develop systems for the removal of these particulate and toxic materials from the air, however, most of these systems have not been commercially accepted.

SUMMARY OF THE INVENTION

The polluted air abatement device disclosed herein provides, in a closed sealed tank, a sinuous air path for polluted air drawn by a series of sprays of liquid through the tank to remove liquid or solid particulate materials and dissolvable gases from the polluted air that passes through the device. Polluted air as contemplated herein refers to any air which has become contaminated with undesired solid, liquid or gaseous particulate or soluble materials. Smoke, dust, exhaust gases and the like are all considered as pollutants of the air. The device includes a closed tank partially filled with liquid and having an inlet flue and an outlet flue. The upper portion of the tank is divided into a number of compartments which are closed at the bottom by the liquid in the lower portion of the tank. Novel sprayer heads having a large number of holes or orifices are provided between each of the compartments and include elongated spray orifices which produce converging sprays of liquid in the direction of polluted airflow. The converging spray of liquid will draw polluted air from one compartment to the next through the holes provided in the sprayer head and will saturate particulate material and dissolve gases in the polluted air. Nozzles are also provided in each of the compartments to direct the polluted air toward the sprayer heads, clean the heads, and to fill each compartment with a spray of liquid to saturate any particulate material such as dust or fly ash in the compartment and to dissolve any gases present in the polluted air. The spray carries the impurities into the liquid in the lower portion of the compartment.

Other objects and advantages of the invention will be apparent from the following description when read in connection with the drawings, in which:

FIG. 3 is a view of the recirculation system.

FIG. 4 is a cross-sectional view taken on line 4-4 of FIG. 3.

FIG. 5 is a view in elevation of the inlet side of one of the sprayer heads in the later stages with a portion of the filter screen broken away.

FIG. 6 is a view in elevation of the outlet side of one of the sprayer heads.

FIG. 7 is a cross-sectional view taken on line 7-7 of FIG. 2.

FIG. 8 is a cross-sectional view taken on line 8-8 of FIG. 2.

FIG. 9 is a cross-sectional view taken on line 9-9 of FIG. 2 showing the filter screen on one of the sprayer heads in the final stages.

FIG. 10 is a cross-sectional view taken on line 10-10 of FIG. 7 showing the inside of the sprayer head.

FIG. 11 is a cross-sectional view taken on line 11-11 of FIG. 10 showing the inside of the sprayer head.

DESCRIPTION OF THE INVENTION

Although the disclosure hereof is detailed and exact to enable those skilled in the art to practice the invention, the physical embodiments herein disclosed merely exemplify the invention which may be embodied in other specific structure.

Figure 1:
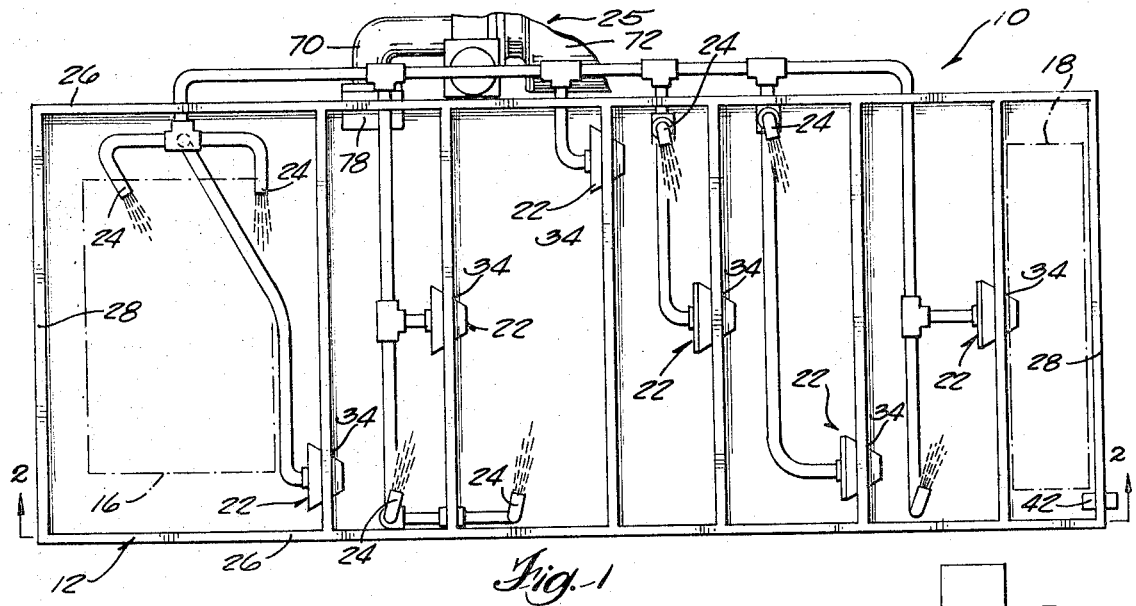
FIG. 1 is a top view of the polluted air abatement device with the cover removed.
Figure 2:
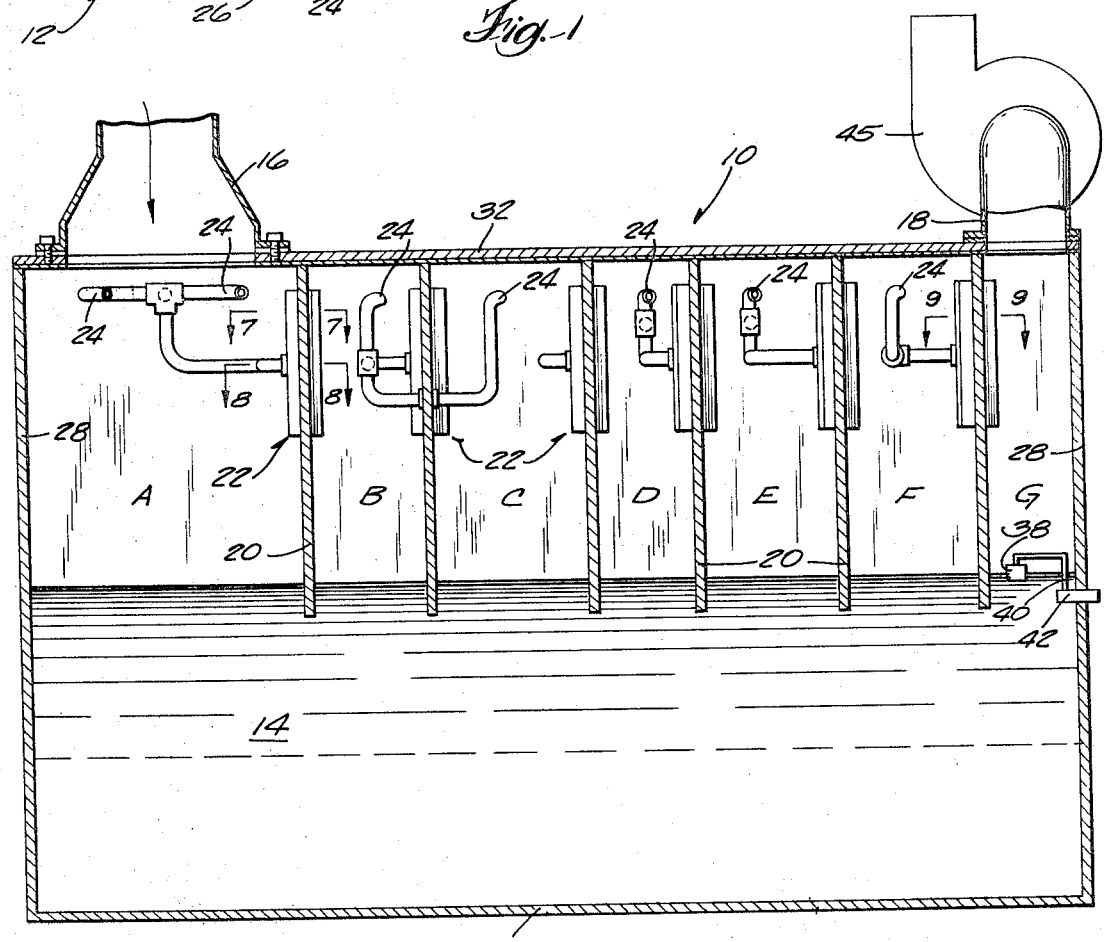
FIG. 2 is a cross-sectional view on line 2-2 of FIG. 1.

As seen in FIGS. 1 and 2 of the drawing, the polluted air abatement device 10 generally includes a closed tank 12 which is partially filled with a liquid 14 such as water and has a polluted air inlet flue 16 at one end and an outlet flue 18 at the other end. Means for moving air through the tank 12 may be provided at either flue such as a fan 45. The portion of the tank 12 above the liquid 14 is divided into a number of compartments or areas A, B, C, D, E, F, and G, by means of a number of baffles or inner walls 20. Polluted air which enters the first compartment A through inlet flue 16 is directed through successive compartments in the series and sprayed with liquid by means of sprayer heads 22 provided between each of the compartments. The polluted air, as it passes from one compartment to the next, is directed by means of sprayer nozzles 24 toward the sprayer heads 22. Liquid is supplied to the sprayer heads 22 and sprayer nozzles 24 by means of a recirculating pump assembly 25. Any pollutants are picked up by the spray of liquid and dropped into the liquid in the lower portion of the tank.

More particularly, the tank 12 includes sidewalls 26, end walls 28, a bottom wall 30 and a top wall 32. The baffles 20 are secured to the inside surface of the sidewalls 26 in a generally parallel relation to the end walls 28 and in abutting contact with the inside surface of the top wall 32 which can be removably mounted on the tank 12. The baffles 20 are spaced from the bottom wall 30 to form a common tank for the liquid 14 below the compartments A through G. Each of the baffles 20 is provided with a port or opening 34 which is staggered or offset from the ports 34 in the adjacent baffles 20 to provide a sinuous polluted airpath through the tank 12.

Means are provided for maintaining the level of liquid 14 in the lower portion of the tank 12 high enough to cover the lower ends of the baffles 20 in order to isolate the compartments A through G from each other, shown in the form of a float 38 connected to actuate a valve 40 in a liquid pipe 42. If the liquid level drops below the required level, the float 38 will open the valve 40 allowing liquid to enter the tank 12.

As seen in FIGS. 5 through 10 each sprayer head 22 includes a plate 44 having passage means for allowing air to pass through the plate 44 in the form of a plurality of openings 46, a top wall 47, a bottom wall 48 and converging sidewalls 49 which form an outlet port 50. A pair of converging inner walls 52 are provided in the sprayer head 22 and are spaced inwardly from the outer walls 48. The converging angle of the walls 48 is greater than the converging angle of the inner walls 52 to form elongated spray orifices 54 on each side of the port 50. An elongated spray or sheet of liquid is directed across the entire air passage means by means of the spray orifices 54 which are set to produce mutually convergent sprays of liquid rearwardly of the port 50. The sprays of liquid are set to converge in the direction of airflow to aid in pulling the polluted air through the plate 44 into the next chamber. The liquid is pumped at high pressure through the nozzles so that the converging sprays on impact produce a vapor mist which cleans the polluted air enveloped in the converging walls of the liquid. Liquid is supplied to the spray orifices 54 by means of an inlet pipe 56 and a cross tube 58 mounted on the plate 44. The cross tube 58 extends through the inner walls 52. The inlet pipe 56 is connected to the recirculation assembly 25 as more fully described below.

Polluted air is directed toward the sprayer heads 22 and is washed in each of the compartments A through G by means of the sprayer nozzles 24 which are mounted on the sidewalls 26 of the tank 12. Each of the sprayer nozzles 24 is positioned to direct liquid toward the plate 44 of the sprayer head 22 to wash any solids off of the plate, to direct polluted air toward the plate, and to clean the polluted air as the polluted air passes through the closely grouped polluted air orifices 46 in the plate 44. The solids, liquids and soluble gases carried in the polluted air will be picked up by the liquid and deposited in the lower portion of the tank.

Liquid is circulated to the spray nozzles 24 and sprayer heads 22 by means of the recirculating assembly 25 which includes a pump 70 driven by a motor 72 mounted on the lower portion of the sidewall 26. The pump 70 is connected to the sprayer nozzles 24 and to the inlet pipe 56 in each of the sprayer heads 22 by conduits 74 and to the inside of the lower portion of the tank 12 by an inlet tube 76. A filter 78 is preferably mounted on the inlet tube 76 to prevent solids in the liquid from entering the pump 70.

Polluted air which passes through the sprayer heads 22 in the last three compartments E, F, and G is filtered by means of a filter 80 mounted on the face of the plate 44 on each of the sprayer heads 22. As seen in FIG. 9, the filter 80 may preferably comprise a fiberglass mat which is porous and is retained on the baffle plate by layers of woven screen 84 and by screws 82.

Independent tests have been made on the abatement device disclosed herein, which indicate that this device functions better than any other device known to the inventor or to the tester, and gives results well within the standards established by HEW. Tests of a pilot sized prototype were conducted under conditions which might be encountered in a field test on an operating power plant. The test equipment was of the approved type used for testing and conducting sampling at a large size operating plant.

In a specific test, a coal burning unit having a grate area of about 2 square feet was used with an appropriate sized polluted air cleaner of the above construction. Stoker sized bituminous coal having a 3.1 percent sulfur content was burned in the unit at about 20 pounds per hour. The unit was connected to the inlet flue 16 of the device and the coal was stirred periodically to create additional polluted air. Visual observation through windows provided in the top 32 of the tank 12 showed heavy concentrations of polluted air in compartment A, discernable polluted air in the middle compartment D and none at the outlet flue 18. The following test results were obtained:

|  | Unit inlet | Outlet |
|---|---|---|
| Sulfur dioxide collected, p.p.m. | 1,720 | 0 |
| Pounds of sulfur dioxide emitted by the stove, per hour | 1.178 | |
| Grains of dust bu., s.c.f. | | 0.0035 |
| Average gas flow, s.c.f.m. | 96 | 396 |
| Velocity of gas at sampling points | 480 | 1,200 |
| Temperature of gas at sampling points | 520 | 85 |
| Scrubber water, ph | | 5 |

| Orsat analysis, percent | Inlet | Outlet |
|---|---|---|
| Carbon dioxide | 1.8 | 0.0 |
| Oxygen | 18.0 | 20.2 |
| Carbon monoxide | 0.4 | 0.0 |
| Nitrogen | 79.8 | 79.8 |

Where a sheet of liquid is referred to in the claims reference is made to liquid which moves substantially in a plane having very little depth but a substantial length and breadth, whether or not said plane or sheet is flat, the plane or sheet being bounded at one side or edge by the free edges of an elongated nozzle. Examples of such nozzles are shown in sheets 2 and 3 of the drawings wherein pairs of convergent plates are supplied with pressurized liquid to emerge from the space between the edges of the plates, typically about one-sixty-fourth of an inch, in a plane or sheet having approximately the depth of the space between the two plates, a height which is about the height of the edges of the two plates and the width determined by the distance the water travels before it strikes something or falls by gravity. As shown, a sheet of water from one such nozzle strikes a sheet of water from another such nozzle whereupon both sheets are disrupted and create a zone of turbulence into which the air passing between the two nozzles must move in order to pass into the next chamber. Thus the sheets are disrupted in actual use, the disruption contributing to the washing of pollution from the air.

Where air is referred to in the claims any gas to be cleaned is included in said term.

I claim:
1. A polluted air abatement device comprising:
 a closed tank having an inlet flue and an outlet flue;
 means for dividing said tank into a plurality of compartments connected in series;
 air passage means between each compartment and the next in said series for allowing air to pass from one compartment to the next;
 means for projecting an elongated sheet of liquid across said air passage means; and
 means for supplying liquid under pressure to said projecting means whereby the polluted air passes through the liquid projected across said air passage means in moving from said inlet flue to said outlet flue, said projecting means comprising a sprayer head in each said compartment, each sprayer head including pairs of outer and inner sidewalls converging in the direction of flow to form elongated spray orifices at each side of said sprayer head, said inner sidewalls defining a portion of said air passage means, said air passage means including a plate having a plurality of closely grouped air orifices, said inner and outer sidewalls being mounted on said plate with said orifices spaced from said elongated spray orifices.

2. A polluted air abatement device according to claim 1 wherein said projecting means is adapted to direct at least two converging sheets of liquid downstream from said air passage means, whereby a zone of turbulence and mist at the intersection of said sheets assists in removing pollution from said air.

3. A device according to claim 1 wherein said air passage means in each compartment is offset from the air passage means in each next compartment, whereby air passing through the device follows a sinuous path.

4. A device according to claim 1 wherein said dividing means includes a number of baffles in said tank, the lower edge of each of said baffles being spaced from the bottom of said tank, said tank being filled with sufficient liquid to cover the lower edge of each of said baffles.

5. A device according to claim 1 including a filter screen on at least said plate in the last compartment of said series.

6. A device according to claim 1 wherein said projecting means is adapted to project at least two converging sheets of liquid downstream from said air passage means, whereby a zone of turbulence and mist at the intersection of said sheets assists in removing pollution from said air.

7. A device according to claim 1 including sprayer nozzles in each of said compartments.

8. A device according to claim 7 in which said sprayer nozzles are arranged to direct a stream of liquid at said plate.

9. In an air pollution abatement device having a series of compartments through which polluted air passes in one direction, the subcombination comprising:
 a sprayer head for interconnecting two of the compartments, said sprayer head including a plate having at least one polluted air orifice;
 convergent pairs of outer and inner sidewalls connected to at least two margins of said plate to form an elongated liquid orifice at each side of said sprayer head, said pairs of sidewalls having closely spaced free edges which form said liquid orifices, respective pairs of sidewalls converging in the direction of airflow from said orifice, said inner walls defining a polluted air port therebetween spaced from said polluted air orifice; and
 means for supplying liquid under pressure to the space between the plates of each said pair, each said liquid orifice being adapted to emit a sheet of liquid across the path of airflow.

10. A device according to claim 9 including a filter screen on said plate.

11. A polluted air abatement device comprising:
 a closed tank partially filled with liquid and having an inlet flue and an outlet flue;
 a plurality of baffles mounted in said tank to form a series of compartments, the lower edge of said baffles being spaced from the bottom of said tank;
 a sprayer head mounted in each baffle and including a plate having an air passage orifice adapted to admit air from each compartment to the next along a path;
 a pair of inner and outer sidewalls on said plate forming an elongated spray orifice at a side of said sprayer head, said orifice being adapted to emit a sheet of liquid across said path when liquid under pressure is supplied thereto;

means for pumping liquid under pressure from said tank to said spray orifice; and a spray nozzle in each compartment adapted to project a stream of liquid droplets at said plate at an angle to the direction of air flow through said plate.

12. A device according to claim 11 including a filter screen on said plate on the last sprayer head in the series of compartments.

13. A device according to claim 11 including means for maintaining the liquid level above the lower edge of said baffles.